July 22, 1969  R. OLLIS, JR  3,456,706
FASTENER UNIT
Filed Nov. 9, 1966
2 Sheets-Sheet 1
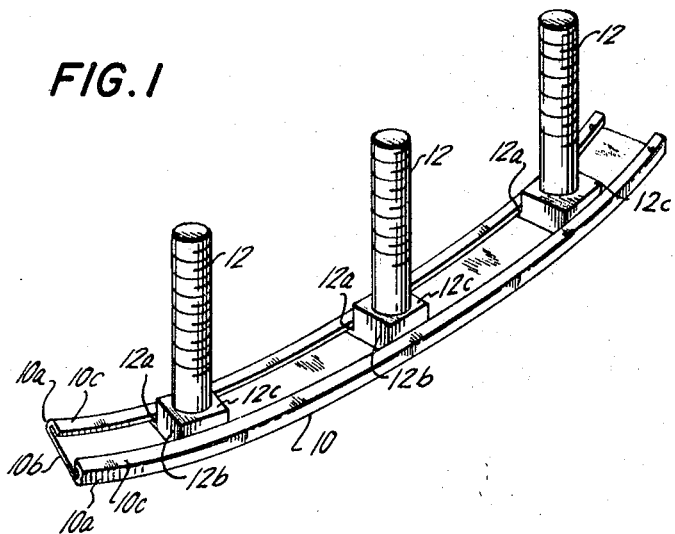
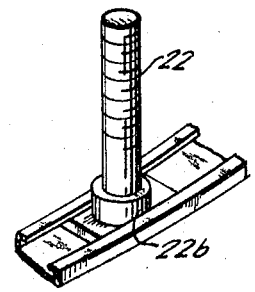
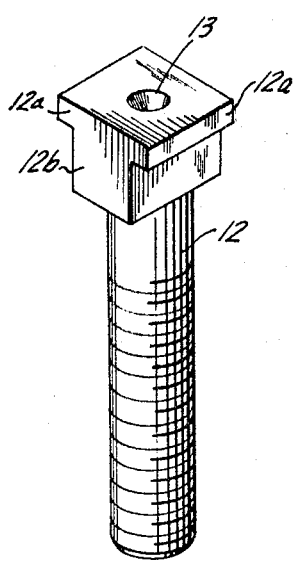
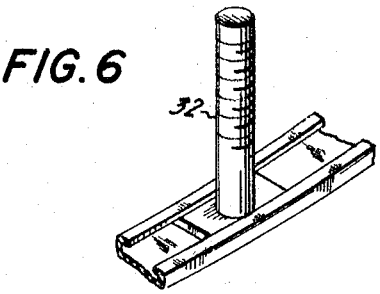
INVENTOR.
RAYMOND OLLIS, Jr.
BY
Curtis, Morris + Safford
ATTORNEYS July 22, 1969  R. OLLIS, JR  3,456,706
FASTENER UNIT
Filed Nov. 9, 1966  2 Sheets-Sheet 2
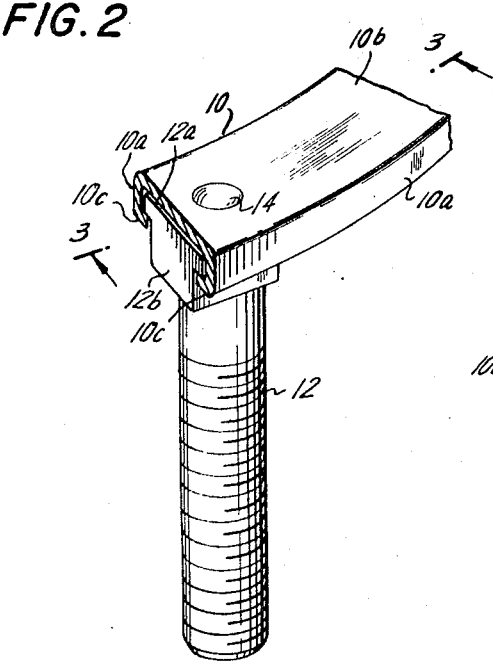
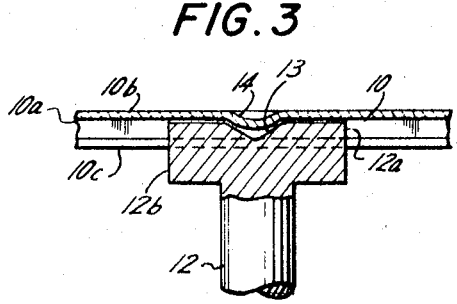
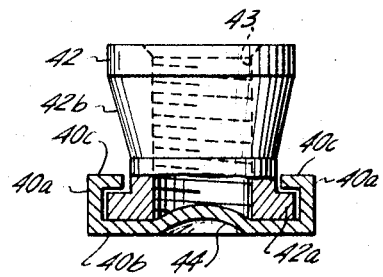
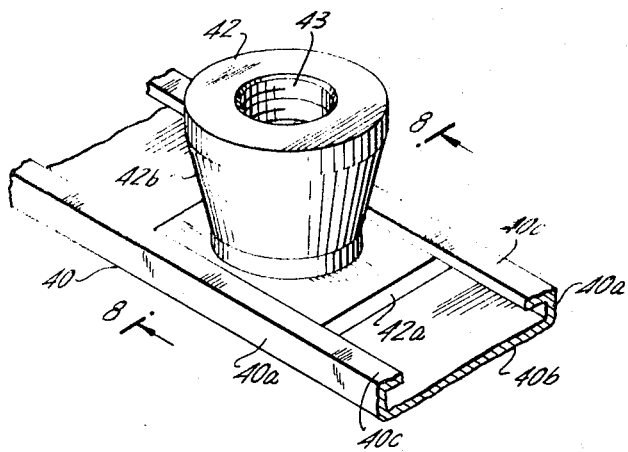
INVENTOR.
RAYMOND OLLIS, Jr.
BY
Curtis, Morris & Safford
ATTORNEYS

United States Patent Office 3,456,706
Patented July 22, 1969

3,456,706
FASTENER UNIT
Raymond Ollis, Jr., Oreland, Pa., assignor to
Standard Pressed Steel Co., Jenkintown, Pa.
Filed Nov. 9, 1966, Ser. No. 593,094
Int. Cl. F16b *39/00, 39/282*
U.S. Cl. 151—41.71                 9 Claims

ABSTRACT OF THE DISCLOSURE

A fastener unit in which a fastener is held on a channel strip by providing the fastener with a flanged portion which fits within the side rails of the channel strip. The fastener also has a cavity in one end thereof into which a dimple in the web of channel extends to limit movements of the fastener along the channel.

---

The present invention relates, in general, to fastening devices and, in particular, to a unit having a floating fastener element which is permitted to undergo slight movements relative to a support component upon which the fastener element is mounted.

It is very difficult in the manufacture and assembly of large structures, such as airplane frames, to achieve exact alignment between mating fastener elements. In order to overcome this difficulty, floating fasteners are employed to accommodate slight misalignments between complementary fastener elements which are within prescribed tolerances.

It is an object of the present invention to provide a new and improved fastening device having one or more floating fastener elements.

It is another object of the present invention to provide such a fastening device in which the fastener elements may be either nuts or bolts.

It is a further object of the present invention to provide a fastener unit which is relatively simple in construction, inexpensive to fabricate and highly reliable in operation.

These objects, as well as others, are achieved according to the present invention by inserting one or more fastener elements into a channel strip having a pair of side flanges joined together by a web and a pair of inturned edge portions extending toward each other from the side flanges. Each fastener has a flanged portion which fits between the web and the inturned edge portions of the channel strip and each flanged portion has at least one transverse dimension which is greater than the distance between the side flanges of the channel strip whereby the rotational movement of the fasteners is limited by the side flanges. The fasteners also have a cavity into which a dimple pressed into the web extends. The dimple and the cavity are shaped and dimensioned to permit limited translational movement of the fastener in the channel strip.

For a better understanding of the present invention, together with other and further objects thereof, reference is made to the following description, taken in connection with the accompanying drawings, and its scope will be pointed out in the appended claims.

FIGURE 1 is a perspective view of a portion of a fastener strip constructed in accordance with the present invention in which bolts are employed as the fastener elements;

FIGURE 2 is an enlarged perspective view of a portion of the fastener strip of FIGURE 1 inverted from its position in FIGURE 1;

FIGURE 3 is a sectional view taken along line 3—3 of FIGURE 2;

FIGURE 4 is a perspective view of a bolt used in the fastener strip of FIGURE 1;

FIGURES 5 and 6 are perspective views of portions of fastener strips constructed in accordance with the present invention in which different types of bolts are employed as the fastener elements;

FIGURE 7 is a perspective view of a portion of another fastener strip constructed in accordance with the present invention in which a nut is employed as the fastener element; and FIGURE 8 is a sectional view taken along line 8—8 of FIGURE 7.

The fastener strip illustrated in FIGURES 1, 2 and 3 includes a channel strip 10 having a pair of side flanges 10a joined together by a web 10b. A pair of inturned edge portions 10c extend toward each other from the side flanges 10a.

A plurality of fasteners such as the bolts 12 is mounted within the channel strip 10 at prescribed points along its length. Each bolt 12 has a flanged portion 12a at its head which is fitted between the web 10b and the inturned edge portions 10c. This flanged portion 12a is most clearly illustrated in FIGURE 4. The flanged portion 12a has at least one transverse dimension which is greater than the distance between the side flanges 10a of the channel strip. This limits the rotational movements of the bolts 12 within the channel strip 10. Both dimensions of the flanged portion 12a, however, are greater than the distance between the inturned edge portions 10c of the channel strip 10 to prevent the flanged portion from passing between the inturned edge portions at any angle of rotation or tilt of the bolts or, more particularly, the flanged portion. The dimensions of the flanged portion 12a determine the amount of rotation which may take place prior to the abutting of two diagonally opposed corners of the flanged portion against the side flanges of the channel strip. The distance between the web 10b and the inturned edge portions 10c determines the extent of movement of the bolts normal to the plane of the web 10b.

Each of the flanged portions 12a also has a cavity 13. Longitudinal movements of the bolts 12 within the channel strip 10 are limited by dimples 14 pressed into the web 10b at prescribed points. The dimples 14 are sufficiently deep to extend into the associated cavity 13. This is most clearly illustrated in the sectional view of FIGURE 3. The dimples 14 and the cavities 13 are shaped and dimensioned to permit limited translational movements of the bolts in the channel strip. Although cavity 13 is shown in FIGURES 3 and 4 as being conical, different shapes may be employed.

Transverse movements of the bolts 12 within the channel strip 10 may be limited in one of two ways. The width of the flanged portion 12a may be selected to result in prescribed transverse movements before the longitudinal edges of the flanged portions abut against the side flanges of the channel strip. Alternatively, transverse movements of the bolts may be limited by abutment of the surfaces of the cavities in the heads of the bolts against the associated dimples 14.

The fastener strip illustrated in FIGURES 1, 2 and 3 is assembled in the following manner. The bolts 12 are introduced into the channel strip 10 by sliding flanged portions 12a between the web 10b and the inturned edge portions 10c. After the fasteners are located at the desired positions along the length of the channel strip 10, the dimples 14 are pressed into the web 10b so as to enter into the associated cavity 13 and thereby captivate the bolts within the channel strip. The bolts, so mounted, have limited longitudinal, transverse and rotational movement within the channel strip as well as limited movement in a direction normal to the plane of the web.

The bolts 12 are seen to have thickened shank portions 12b which extend from the flanged portions 12a to a point beyond the inturned edge portions 10c of the channel strip 10. This is a particularly advantageous feature of the fastener strip of FIGURE 1 in that a member being secured to another member by the fastener strip bears against the lower shoulders of the thickened shank portion 12b rather than the inturned edge portions 10c of the channel strip 10. Although not illustrated the thickened shank portion may have a second flange formed thereon below the channel strip to provide increased bearing area without increasing the width of the channel strip. Bolt 12 normally is made of a stronger material than is the channel strip. As illustrated the only force or bearing to which the channel strip 10 is subjected is the anti-rotational force on the inside surfaces of the side flanges 10a caused by abutment of the corners of the flanged portions 12a against the side flanges. The channel assembly illustrated in FIGURE 2 is capable of accommodating itself over structural irregularities. In assembly there is a space the height of the thickened shank portion 12b between the channel strip 10 and the structure to which it is attached.

FIGURES 5 and 6 illustrate portions of fastener strips constructed in accordance with the present invention in which different types of bolts are employed as the fastener elements. In FIGURE 5, the bolt 22 also is provided with a thickened shank portion 22b which is of circular cross-section whereas the thickened shank portion 12b of FIGURES 1 and 4 is of rectangular cross-section. In FIGURE 6, the bolt 32 is not provided with any thickened shank portion. The fastener strip in FIGURE 6, however, is similar to those in FIGURES 1 and 5 in all other aspects.

FIGURE 7 is a perspective view of a portion of another fastener strip constructed in accordance with the present invention in which a nut 42 is employed as the fastener element. The nut 42 has flanged portion 42a and a body portion 42b through which the internally threaded bore 43 extends. The flanged portion 42a is similar to the flanged portions 12a at the heads of the bolts 12 in FIGURES 1 through 4. The flanged portion 42a is fitted between the web 40b and the inturned edge portions 40c of a channel strip 40. This is most clearly illustrated in the sectional view in FIGURE 8.

As was the case with the bolts 12 in FIGURES 1 through 4, the dimensions of the flanged portion 42a determined the amount of rotation which may take place prior to two diagonally opposed corners of this flanged portion abutting against the side flanges 40a of the channel strip 40. The distance between the web 40b and the inturned edge portions 40c determines the extent of movement of the nut 42 normal to the plane of the web 40b.

Longitudinal movements of the nut 42 within the channel strip 40 are limited by a dimple 44 pressed into the web 40b. The dimple 44 is sufficiently deep to extend into and one end of the internally threaded bore 43 of the nut 42. Thus, the end of the internally threaded bore 43 into which the dimple 44 extends corresponds to the cavity 13 in the bolts 12 in FIGURES 1 through 4 and translational movements of the nut 42 are limited by the surface of the bore abutting against the dimple.

The fastener strip illustrated in FIGURES 7 and 8 is assembled in the following manner. The nut 42 is introduced into the channel strip 40 by sliding the flanged portion 42a between the web 40b and the inturned edge portions 40c. After the nut is located at the desired position along the length of the channel strip 40, the dimple 44 is pressed into the web 40b so as to enter into the bore in the nut and thereby captivate the nut within the channel strip. The nut so mounted, has limited longitudinal, transverse and rotational movement within the channel strip as well as limited movement in a direction normal to the plane of the web. In addition the threaded portion 43 of the nut 42 and its mated bolt thread portion, are protected against adverse environmental conditions since there are no holes in the channel strip communicating with the nut bore.

Although the body portion 42b of the nut 42 is illustrated as being tapered, it will be apparent that this is not necessary. A tapered body portion, however, is advantageous in that a larger bearing surface may be provided at the open end of the nut 42, while maintaining a small neck near the flanged portion 42a so as to permit the use of relatively narrow channels. Although, not illustrated, the nut 42 may have a resilient locking element of the distorted thread type formed therein, preferably in the area of the nut closest to the channel strip 40 to permit run in of a male threaded member prior to its locking.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:

1. A fastener unit comprising:
   a channel strip having a pair of side flanges joined together by a web and a pair of inturned edge portions extending toward each other from said side flanges;
   a fastener having a flanged portion fitted between said web and said inturned edge portions, said flanged portion having at least one transverse dimension which is greater than the distance between said side flange whereby the rotational movement of said fastener is limited by said side flanges, said fastener also having a cavity at one end thereof;
   and an imperforate dimple in said web extending into said cavity, said dimple and said cavity being shaped and dimensioned to permit limited translational movements of said fastener in said channel strip.

2. A fastener unit according to claim 1 wherein said fastener is a bolt element, said flanged portion is at the head of said bolt element and said cavity is in said head of said bolt element.

3. A fastener unit according to claim 2 wherein said bolt element has a thickened shank portion extending away from said flanged portion to beyond said inturned edge portions of said channel strip.

4. A fastener unit according to claim 3 wherein said thickned shank portion is of rectangular cross-section.

5. A fastener unit according to claim 3 wherein said thickened shank portion is of circular cross-section.

6. A fastener unit according to claim 2 wherein said cavity is conical.

7. A fastener unit according to claim 1 wherein said fastener is a nut element and said cavity corresponds to one end of the internally threaded bore of said nut element.

8. A fastener unit according to claim 1 wherein said fastener is provided with a bearing surface which is disposed on the opposite side of said inturned edge portions of said channel strip from said web of said channel strip.

9. A fastener unit comprising:
   a channel strip having a pair of side flanges joined together by a web and a pair of inturned edge portions extending toward each other from said side flanges;
   a nut element having a flanged portion fitted between said web and said inturned edge portions, said flanged portion having at least one transverse dimension which is greater than the distance between said side flanges whereby the rotational movement of said nut element is limited by said side flanges, said nut element having a tapered body portion through which an internally threaded bore extends, said body portion increasing in diameter as the distance from said flanged portion increases;

and a dimple in said web extending into one end of said internally threaded bore, said dimple and said internally threaded bore being shaped and dimensioned to permit limited translational movements of said nut element in said channel strip.

References Cited

UNITED STATES PATENTS

| | | | |
|---|---|---|---|
| 1,732,992 | 10/1929 | Spiro | 151—41.76 |
| 2,140,628 | 12/1938 | Hoff | 151—41.76 |
| 2,144,350 | 1/1939 | Swanstrom | 151—41.76 |
| 2,191,613 | 2/1940 | Ericsson | 151—41.7 |
| 3,304,980 | 2/1967 | Koehl | 151—41.74 |
| 3,004,638 | 10/1961 | Eaton | 151—41.74 |
| 2,455,145 | 11/1948 | Swanstrom | 151—41.76 |

FOREIGN PATENTS 868,086  5/1961  Great Britain.

EDWARD C. ALLEN, Primary Examiner

U.S. Cl. X.R.

151—41.76